(12) United States Patent
Brothers

(10) Patent No.: US 6,962,201 B2
(45) Date of Patent: Nov. 8, 2005

US006962201B2

(54) CEMENT COMPOSITIONS WITH IMPROVED MECHANICAL PROPERTIES AND METHODS OF CEMENTING IN SUBTERRANEAN FORMATIONS

(75) Inventor: Lance E. Brothers, Chickasha, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 192 days.

(21) Appl. No.: 10/374,296

(22) Filed: Feb. 25, 2003

(65) Prior Publication Data

US 2004/0163812 A1 Aug. 26, 2004

(51) Int. Cl.$^7$ .......................................... E21B 33/138
(52) U.S. Cl. ..................................................... 166/293
(58) Field of Search ....................... 166/285, 292–295; 106/713, 816

(56) References Cited

U.S. PATENT DOCUMENTS

| | | | |
|---|---|---|---|
| 3,901,316 A | 8/1975 | Knapp | 166/250 |
| 4,111,710 A | 9/1978 | Pairaudeau et al. | 106/90 |
| 4,256,503 A | 3/1981 | Tsuda et al. | 106/100 |
| 4,314,003 A | 2/1982 | Curnow et al. | 428/294 |
| 4,397,354 A | 8/1983 | Dawson et al. | 166/293 |
| 4,627,998 A | 12/1986 | Akihama et al. | 428/285 |
| 4,784,223 A | 11/1988 | Worrall et al. | 166/287 |
| 4,916,012 A | 4/1990 | Sawanobori et al. | 428/367 |
| 4,927,462 A | 5/1990 | Sugama | 106/99 |
| 5,032,181 A | 7/1991 | Chung | 106/717 |
| 5,258,222 A | 11/1993 | Crivelli | 428/323 |
| 5,293,938 A * | 3/1994 | Onan et al. | 166/293 |
| 5,391,226 A | 2/1995 | Frankowski | 106/696 |
| 5,398,759 A | 3/1995 | Rodrigues et al. | 166/293 |
| 5,456,751 A | 10/1995 | Zandi et al. | 106/724 |
| 5,569,324 A | 10/1996 | Totten et al. | 106/696 |
| 5,688,844 A | 11/1997 | Chatterji et al. | 524/8 |
| 5,712,314 A * | 1/1998 | Surles et al. | 166/295 |
| 5,779,787 A | 7/1998 | Brothers et al. | 106/802 |
| 5,820,670 A | 10/1998 | Chatterji et al. | 106/727 |
| 6,059,035 A | 5/2000 | Chatterji et al. | 166/293 |
| 6,059,036 A | 5/2000 | Chatterji et al. | 106/294 |
| 6,152,227 A | 11/2000 | Lawson et al. | 166/293 |
| 6,220,354 B1 | 4/2001 | Chatterji et al. | 166/293 |
| 6,230,804 B1 | 5/2001 | Mueller et al. | 166/293 |
| 6,308,777 B2 | 10/2001 | Chatterji et al. | 166/293 |
| 6,458,198 B1 * | 10/2002 | Baret et al. | 106/644 |
| 6,500,252 B1 | 12/2002 | Chatterji et al. | 106/644 |
| 6,508,305 B1 | 1/2003 | Brannon et al. | 166/293 |
| 6,520,258 B1 * | 2/2003 | Yang et al. | 166/297 |
| 6,582,819 B2 * | 6/2003 | McDaniel et al. | 428/402 |
| 6,742,592 B1 | 6/2004 | Le Roy-Delage et al. | 166/293 |
| 2003/0200903 A1 | 10/2003 | Mattus | 106/802 |

FOREIGN PATENT DOCUMENTS

| | | | |
|---|---|---|---|
| FR | 2 799 458 | 4/2001 | |
| JP | 1069541 | 3/1989 | |
| JP | 7048154 | 2/1995 | |
| JP | 7048155 | 2/1995 | |
| JP | 2533562 | 9/1996 | C04B/14/38 |
| JP | 2757108 | 5/1998 | |
| JP | 2876508 | 3/1999 | C04B/14/38 |
| WO | WO 01/20350 A1 | 4/2000 | G01R/25/00 |
| WO | WO 01/25163 A1 | 4/2001 | E21B/33/13 |

OTHER PUBLICATIONS

Publication entitled "Interfaces and Mechanical Behaviors of Fiber–Reinforced Calcium Phosphate Cement Compositions", by T. Sugama et al.
Prepared for the Geothermal Division U.S. Department of Energy; Department of Applied Science, Jun. 1992, but admitted to be prior art.
Publication entitled "Rubber–Tire Particles As Concrete Aggregate" by Neil N. Eldin et al. published in the Journal of Materials In Civil Engineering, vol. 5, No. 4, pp. 478–496, Nov. 1993.
Publication entitled The Properties of Rubberized Concretes by I. B. Topcu published in the Cement and Concrete Research Journal, vol. 25, No. 2, pp. 304–310 (1995) (no month).

* cited by examiner

*Primary Examiner*—Zakiya Walker
(74) *Attorney, Agent, or Firm*—Craig W. Roddy; Baker Botts L.L.P.

(57) ABSTRACT

Cement compositions with improved mechanical properties and associated methods are provided, which are useful in conjunction with subterranean well operations. In certain embodiments, the cement compositions comprise carbon fibers, rubber particles, a hydraulic cement material, sufficient water to form a pumpable slurry, and optionally other ingredients including a dispersant, a weighting agent, a retarding or accelerating agent, or the like.

25 Claims, No Drawings

CEMENT COMPOSITIONS WITH IMPROVED MECHANICAL PROPERTIES AND METHODS OF CEMENTING IN SUBTERRANEAN FORMATIONS

BACKGROUND OF THE INVENTION

1. Field of the Invention

The present invention relates to subterranean well cementing operations, and more particularly, to cement compositions having improved mechanical properties and methods of using same.

2. Description of the Prior Art

Hydraulic cement compositions are commonly utilized in subterranean well completion and remedial operations. For example, hydraulic cement compositions are used in primary cementing operations whereby strings of pipe such as casing and liners are cemented in well bores. In performing primary cementing, a hydraulic cement composition is pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surfaces of the pipe string to the walls of the well bore. Hydraulic cement compositions also are used in remedial cementing operations such as plugging highly permeable zones or fractures in well bores, plugging cracks in holes in pipe strings, and the like.

Set cement in wells, and particularly the set cement sheath in the annulus of a well, may fail due to, inter alia, shear and compressional stresses exerted on the set cement. This may be particularly problematic in high temperature wells, which are wells wherein fluids injected into the wells, or produced from the wells by way of the well bore, causes a temperature increase over initial cement setting conditions of at least about 100° F. In these types of wells, set cements often fail as a result of the stresses exerted on the set cement.

The stress exerted on the cement as referred to herein means the force applied over an area resulting from the strain caused by the incremental change of a body's length or volume. The stress is generally thought to be related to strain by a proportionality constant known as Young's Modulus. Young's Modulus is known to characterize the flexibility of a material. In a well bore sealing application, the Young's Modulus is about $30 \times 10^6$ $lb_f/in^2$.

There are several stressful conditions that have been associated with well bore cement failures. One example of such a condition results from the relatively high fluid pressures and/or temperatures inside of the set casing during testing, perforation, fluid injection, or fluid production. If the pressure and/or temperature inside the pipe increases, the resultant internal pressure expands the pipe, both radially and longitudinally. This expansion places stress on the cement surrounding the casing causing it to crack, or the bond between the outside surface of the pipe and the cement sheath to fail in the form of, inter alia, loss of hydraulic seal. Another example of such a stressful condition is where the fluids trapped in a cement sheath thermally expand causing high pressures within the sheath itself. This condition often occurs as a result of high temperature differentials created during production or injection of high temperature fluids through the well bore, e.g., wells subjected to steam recovery processes or the production of hot formation fluids. Other stressful conditions that can lead to cement failures include the forces exerted by shifts in the subterranean formations surrounding the well bore or other over-burdened pressures.

Failure of cement within the well bore can result in radial or circumferential cracking of the cement as well as a breakdown of the bonds between the cement and the pipe or between the cement sheath and the surrounding subterranean formations. Such failures can result in at least lost production, environmental pollution, hazardous rig operations, and/or hazardous production operations. A common result is the undesirable presence of pressure at the well head in the form of trapped gas between casing strings. Additionally, cement failures can be particularly problematic in multi-lateral wells, which include vertical or deviated (including horizontal) principal well bores having one or more ancillary, laterally extending well bores connected thereto.

In both conventional single bore wells and multi-lateral wells having several bores, the cement composition utilized for cementing casing or liners in the well bores must develop high bond strength after setting and also have sufficient resiliency, e.g., elasticity and ductility, to resist loss of pipe or formation bonding, cracking and/or shattering as a result of all of the stressful conditions that may plague the well, including impacts and/or shocks generated by drilling and other well operations.

SUMMARY OF THE INVENTION

The present invention provides a cement composition having improved mechanical properties including tensile strength and elasticity, and methods for using same.

A preferred method of the present invention comprises the steps of providing a cement composition comprising rubber particles and carbon fibers, introducing the cement composition to a subterranean well bore, and allowing the cement composition to set therein.

One embodiment of the cement compositions of the present invention involves the addition of carbon fibers to a hydraulic cement composition comprising rubber particles, inter alia, to increase the tensile strength of the cement composition. Optionally, other additives suitable for cement compositions such as dispersants, retardants, accelerants, weighting agents, and the like may be added to the cement compositions of the present invention.

The objects, features and advantages of the present invention will be readily apparent to those skilled in the art upon a reading of the description of the preferred embodiments which follows.

DESCRIPTION OF PREFERRED EMBODIMENTS

The present invention provides cement compositions having improved mechanical properties, including elasticity, ductility, and tensile strength, and methods of utilizing these cement compositions in subterranean well cementing applications. While the compositions and methods are useful in a variety of well completion and remedial operations, they are particularly useful in primary cementing, e.g., cementing casings and liners in well bores, including those in multi-lateral subterranean wells.

The improved cement compositions of the present invention generally comprise a hydraulic cement, carbon fibers, rubber particles, and water sufficient to form a pumpable slurry. Other additives suitable for use in subterranean well bore cementing operations also may be added to these compositions if desired.

Any cement suitable for use in subterranean well cementing operations may be used in accordance with the present invention. Preferably, in one embodiment, the improved cement compositions of the present invention comprise a hydraulic cement. A variety of hydraulic cements are suitable for use in the compositions and methods of the present invention including those comprised of calcium, aluminum, silicon, oxygen, and/or sulfur, which set and harden by reaction with water. Such hydraulic cements include but are not limited to, Portland cements, pozzolana cements, gypsum cements, high alumina content cements, silica cements, and high alkalinity cements. A preferred cement is commercially available under the trade designation "THERMALOCK" available from Halliburton Energy Services in Houston, Tex., which is a calcium phosphate cement.

The water utilized in the cement compositions of this invention can be fresh water, salt water (e.g., water containing one or more salts dissolved therein), brine (e.g., saturated salt water produced from subterranean formations), or seawater. Generally, the water can be from any source provided that it does not contain an excess of compounds that adversely affect other components in the cement composition. The water may be present in an amount sufficient to form a pumpable slurry. More particularly, the water is present in the cement compositions in an amount in the range of from about 25% to about 100% by weight of cement therein, more preferably in the range of from about 30% to about 50% by weight of cement material therein.

The carbon fibers that are present in the cement compositions of the present invention preferably have a mean length of about 1 mm or less. In certain preferred embodiments, the mean length of the carbon fibers is from about 50 to about 500 microns. Most preferably, the fibers have a mean length in the range of about 100 to about 200 microns. Preferably, they are milled carbon fibers. An example of suitable carbon fibers includes the commercially available "AGM-94" carbon fibers available from Asbury Graphite Mills Inc. that have a mean length of about 150 microns and a diameter of about 7.2 microns. Preferably, the carbon fibers are present in the amount of about 1% by weight of cement to about 15% by weight of cement in the cement composition.

The rubber particles that may be used in the cement compositions of the present invention may be ¼ inch or less, preferably in the range of about 10/20 to 20/30 mesh. The particles can be obtained from any suitable source. One example of such a suitable source is recycled automobile tires, which may be obtained from, for example, Four D Corporation, Duncan, Oklahoma. Vulcanized rubber particles are suitable. Preferably, the rubber particles are present in the amount of about 5% to about 50% by weight of the cement in the cement composition. The most preferred range is from about 10% to about 40% by weight of cement in the composition.

It has been found that adding rubber particles to a cement composition affects the mechanical properties of the cement composition by, inter alia, improving its elasticity and ductility. This is desirable to counteract the possible stresses the cement may endure. However, when rubber particles are added in quantities sufficient to desirably affect the elasticity of the cement, the tensile strength of the cement is also reduced. The risk of rupture of the cement sheath in response to a stressful condition is directly linked to the tensile strength of the cement, and the risk is attenuated when the ratio of the tensile strength of the cement to its Young's Modulus is increased. Thus, adding carbon fibers to a cement composition that comprises rubber particles is desirable to increase the tensile strength of the cement composition containing the rubber particles. Also, adding carbon fibers as opposed to other additives, such as polypropylene, has the added benefit of providing increased temperature stability to the cement composition. This makes the cement compositions of the present invention especially suitable for use in or in conjunction with hostile well bore conditions, such as high temperatures and/or high pressures.

As will be recognized by those skilled in the art, when the cement compositions of the present invention are utilized for primary or remedial subterranean well operation, such compositions can also include additional suitable additives, for example, dispersants, fluid loss agents, weighting materials, and the like. While a variety of dispersants known to those skilled in the art may be used in accordance with the present invention, a preferred dispersing agent is a water-soluble polymer prepared by the caustic catalyzed condensation of formaldehyde with acetone wherein the polymer contains sodium sulfate groups. Such a preferred dispersing agent is commercially available under the trade designation "CFR-3" from Halliburton Energy Services of Duncan, Okla. Another suitable dispersant is commercially available under the trade designation "CFR-2" from Halliburton Energy Services in Duncan, Okla.

The cement compositions of the present invention also can include other additives such as accelerants or retarders, if desired. If an accelerant is used, the accelerant is preferably calcium chloride and is present in an amount in the range from about 1.0% to about 2.0% by weight of the cement in the compositions. Fluid loss additives such as hydroxyethylcellulose, carboxymethylcellulose, carboxymethylhydroxyethylcellulose, hydroxypropylcellulose, hydroxypropylguar, guar, polyvinylalcohol, or polyvinylacetate are also suitable.

An example of a preferred cement composition of the present invention is a composition of THERMALOCK calcium phosphate cement, sufficient water to form a pumpable slurry, 1% by weight of the cement CFR-3 dispersant, 20% by weight of the cement 20/30 mesh rubber particles, and 5% by weight of the cement milled carbon fibers having a mean length of 150 microns.

A preferred method of the present invention comprises providing a cement composition that comprises rubber particles and carbon fibers; introducing this cement composition to a subterranean well bore; and allowing the cement composition to set therein.

To facilitate a better understanding of the present invention, the following examples of some of the preferred embodiments are given. In no way should such examples be read to limit the scope of the invention.

EXAMPLES

Test samples of preferred embodiments of the cement compositions of the present invention were made and the tensile strength of each composition was determined. Comparative samples were also made and similarly tested. To prepare the samples of the cement compositions, THERMALOCK calcium phosphate cement was mixed with 35% by weight of the cement water, and cured for 14 days at 600° F. To certain sample cement composition, rubber particles and/or carbon fibers were added in chosen ratios as described in Table 1. The rubber particles were 20/30 mesh rubber particles derived from recycled automobile tires and obtained from Four D Corporation of Duncan, Okla. The carbon fibers were milled fibers, specifically AGM-94 fibers from Asbury Graphite Mills Inc., with a mean length of 150 microns and a diameter of 7.2 microns. The tensile strength of each cement composition was then determined. All tests were performed in accordance with ASTM C190-85.

Table 1 below lists the percentage of rubber particles and carbon fibers that were added to each cement composition and the resultant tensile strength.

TABLE 1

| Sample Description | 20/30 Mesh Rubber Particles (% by weight of cement) | Milled Carbon Fibers (% by weight of cement) | Tensile Strength (psi) |
|---|---|---|---|
| Comparative Sample No. 1 | 0 | 0 | 480 |
| Comparative Sample No. 2 | 0 | 5 | 510 |
| Comparative Sample No. 3 | 20 | 0 | 60 |
| Example of Preferred Embodiment Sample No. 4 | 20 | 5 | 300 |

Comparative Sample No. 1 illustrates the tensile strength of a cement composition when neither rubber particles nor carbon fibers have been added to the composition. This was used as a control sample. The tensile strength was 480 psi.

Comparative Sample No. 2 illustrates the tensile strength of a cement composition containing milled carbon fibers but not rubber particles. The tensile strength was 510 psi, increased from Comparative Sample No. 1.

Comparative Sample No. 3 illustrates the tensile strength of a cement composition comprising rubber particles. As is evident from Table 1, the addition of 20/30 mesh rubber particles to the cement composition reduces the tensile strength of the cement. The tensile strength was 60 psi.

As can be seen from Sample 4, which is an typical composition of the present invention, by adding milled carbon fibers to the cement composition comprising mesh rubber particles, the tensile strength of the cement comprising the mesh rubber particles was increased by a factor of 5 to 300 psi; thus, indicating that the tensile strength of the cement was enhanced by the addition of the carbon fibers.

Therefore, the present invention is well-adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing in a subterranean formation comprising the steps of:
   providing a cement composition comprising a hydraulic cement, rubber particles, and carbon fibers;
   placing the cement composition in the subterranean formation; and
   allowing the cement composition to set therein.

2. The method of claim 1 wherein the hydraulic cement is selected from the group consisting of Portland cements, pozzolana cements, gypsum cements, high alumina content cements, silica cements, and high alkalinity cements.

3. The method of claim 1 wherein the hydraulic cement comprises a calcium phosphate cement.

4. The method of claim 1 wherein the rubber particles are present in an amount of about 5% to about 50% by weight of the hydraulic cement in the composition.

5. The method of claim 1 wherein the carbon fibers are present in an amount of about 1% to about 15% by weight of the hydraulic cement in the composition.

6. The method of claim 1 wherein the rubber particles have a mean length of about ¼ inch or less.

7. The method of claim 1 wherein the carbon fibers have a mean length of about 150 microns.

8. The method of claim 1 wherein the cement composition further comprises an additive wherein the additive is a dispersant, a retardant, an accelerant, a fluid loss agent, a weighting agent, or a mixture thereof.

9. The method of claim 1 wherein the cement composition has a tensile strength greater than 60 psi.

10. The method of claim 1 wherein the rubber particles have a mean length of about ¼ inch or less and are present in an amount of about 5% to about 50% by weight of the hydraulic cement in the composition, and wherein the carbon fibers have a mean length of about 150 microns and are present in an amount of about 1% to about 15% by weight of the hydraulic cement in the composition.

11. A method of increasing the tensile strength of a cement composition comprising rubber particles comprising the step of adding carbon fibers to the cement composition wherein the carbon fibers have a mean length of about 1 mm or less.

12. The method of claim 11 wherein the carbon fibers are present in an amount of about 1% to about 15% by weight of a cement component of the cement composition.

13. The method of claim 11 wherein the rubber particles are present in an amount of about 5% to about 50% by weight of a cement component of the cement composition.

14. The method of claim 11 wherein the cement composition comprises a hydraulic cement selected from the group consisting of Portland cements, pozzolana cements, gypsum cements, high alumina content cements, silica cements, high alkalinity cements and calcium phosphate cements.

15. A method of cementing in a subterranean formation comprising the steps of:
   providing a cement composition comprising a hydraulic cement and carbon fibers, the carbon fibers having a mean length of about 1 mm or less;
   placing the cement composition in the subterranean formation; and
   allowing the cement composition to set therein.

16. The method of claim 15 wherein the cement composition further comprises rubber particles.

17. The method of claim 16 wherein the rubber particles are present in an amount of about 5% to about 50% by weight of the hydraulic cement in the composition.

18. The method of claim 16 wherein the rubber particles have a mean length of about ¼ inch or less.

19. The method of claim 15 wherein the hydraulic cement is selected from the group consisting of Portland cements, pozzolana cements, gypsum cements, high alumina content cements, silica cements, high alkalinity cements and calcium phosphate cements.

20. The method of claim 15 wherein the carbon fibers are present in an amount of about 1% to about 15% by weight of the hydraulic cement component of the cement composition.

21. The method of claim 15 wherein the hydraulic cement comprises a calcium phosphate cement.

22. The method of claim 15 wherein the carbon fibers have a mean length of about 50 microns to about 500 microns.

23. The method of claim 15 wherein the carbon fibers have a mean length of about 100 microns to about 200 microns.

24. The method of claim 15 wherein the cement composition further comprises an additive wherein the additive is a dispersant, a retardant, an accelerant, a fluid loss agent, a weighting agent, or a mixture thereof.

25. The method of claim 15 wherein the cement composition has a tensile strength greater than 60 psi.

* * * * *